(12) United States Patent
Ellison (10) Patent No.: US 8,166,470 B2
(45) Date of Patent: Apr. 24, 2012

(54) METHOD FOR REPLACING CODE IN A RUNNING OBJECT ORIENTED PROGRAM

(75) Inventor: Timothy Peter Ellison, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 11/159,960

(22) Filed: Jun. 23, 2005

(65) Prior Publication Data

US 2006/0005171 A1    Jan. 5, 2006

(30) Foreign Application Priority Data

Jul. 3, 2004   (GB) .................................. 0414983.7

(51) Int. Cl.
*G06F 9/445* (2006.01)
(52) U.S. Cl. ........................................ 717/169; 717/175
(58) Field of Classification Search .................. None
See application file for complete search history.

(56) References Cited

U.S. PATENT DOCUMENTS

2004/0006765 A1* 1/2004 Goldman ..................... 717/116
* cited by examiner

*Primary Examiner* — Chuck Kendall
(74) *Attorney, Agent, or Firm* — Law Office of Jim Boice (57) ABSTRACT

The invention is directed to a method of replacing code in an object oriented application program running on a Virtual Machine (VM). The method comprises the steps of receiving at the virtual machine a request to replace code; in response to receipt of said request, examining each thread's call stack to determine if any thread includes a method that will be made obsolete by a proposed code replacement; and, if it is determined that there are no threads that include such a method in their call stacks, performing the code replacement. However, for a thread whose call stack is determined to include a method that will be made obsolete by the proposed code replacement, the method includes the step of allowing the thread to continue running until the thread unwinds past that method in its call stack and then suspending said thread. This comprises a part of a process of determining a safe state for code replacement. The invention is also directed to a method of initializing new variables in such replacement code. The variable initialization method comprises the steps of identifying the replaced code and prior to resuming threads containing the replacement code, initializing new variables in the replacement code to values consistent with the application semantics.

78 Claims, 5 Drawing Sheets

METHOD FOR REPLACING CODE IN A RUNNING OBJECT ORIENTED PROGRAM

FIELD OF THE INVENTION

The present invention concerns a method for replacing code in a running object oriented program such as a Java program.

BACKGROUND OF THE INVENTION

Object oriented programming based on an object model is a new way of programming computer programs that has become very popular over the past several years. Object oriented programming uses objects as its fundamental program building blocks rather than procedures as in conventional procedural programming. The focus of object-oriented program design is to define a set of autonomous entities that can work together. These autonomous entities are, of course, the objects.

Conceptually, an object has two parts, an external object interface and internal object data. Internal data is encapsulated by the object interface such that other objects must communicate with that object through its interface. Thus, the only way to retrieve, process or otherwise operate on the encapsulated data is through methods defined on the object. This protects the internal portion of the object from outside tampering. Additionally, because outside objects have no access to the internal implementation, that internal implementation can change without affecting other aspects of the program. The object system thus isolates the requestor of services (clients) from the providers of services (servers) by a well defined encapsulating interface.

Data in an object is operated upon by calling "methods" on the object. In the object model, a client object sends a call to the server object system. The call identifies a particular object and specifies what method is to be performed by the object, and provides any parameters required. The object interprets the message to decide what service to perform, and returns back any data that results.

Another central concept in object-oriented programming is the class. A class is a template that defines a type of object. A class is defined by a set of class parameters that specify the details of objects that belong to its class. By defining a class, objects can be created that belong to the class without having to rewrite the entire definition. This promotes the reusability of existing definitions and promotes efficient use of program code.

As already stated, object-oriented programming uses objects that interact with each other through method calls. These method calls are implemented by threads. For example, for an object A to interact with an object B, a thread first gets object A. While running within A's method the thread then gets object B and calls one of B's method. Thus, all parts of the interaction are performed by the same thread. This interaction is referred to as "A calls B.".

There are many computer languages that support object-oriented programming. For example, Smalltalk, Object Pascal, C++ and Java are all programming languages that to one degree or another support object-oriented programming. Any of these and others can be used to write programs that use objects.

The Java language in particular has rapidly gained importance as a standard object-oriented programming language since its advent in late 1995. "Java" is a trademark of Sun Microsystems, Inc. Java programs (also known as Java class files) are converted from a well defined application program source code into an architecture-neutral, machine independent code, called Java bytecode. The Java bytecodes are designed to execute on a Java Virtual Machine (JVM). A JVM is not an actual hardware platform, but is a low level software emulator that can be implemented on many different computer processor architectures and under many different computer operating systems. Thus, the JVM is a virtual computer component that resides only in the memory of a computer platform.

A run-time class replacement facility for use in debugging Java programs during run-time provides the ability to substitute modified code in a running application through the debugger APIs. This feature of the Java Virtual Machine addresses issues such as vendors wanting the ability to do fix-and-continue debugging, i.e. while debugging, identify a problem, fix it, and continue debugging with fixed code, and organizations deploying long running servers wishing to be able to fix bugs without taking down the server. However, the ability to replace code in a running server in this way is not a specifically advertised use of the API. In fact, many JVMs either do not implement the API or do so only when running in a "non-production" mode due to the problems addressed by the present invention.

Sun Microsystems' Java programming language HotSwap Class File Replacement (HCR) feature comprises a useful part of Sun's Java Platform Debugger Architecture (JPDA). The JPDA is a specification document that describes debugging a JVM. The specification may be implemented by various computer programs, including Integrated Development Environments (IDEs). A Debugging tool (program) enables a software developer to debug a Java program whilst it is running on a JVM. The HCR feature of the JPDA allows a loaded class to be redefined through a call to the JVM. In the reference implementation, this functionality is implemented at the Java Virtual Machine Debug Interface (JVMDI) layer and made available through the higher layers of JPDA—the Java Debug Wire Protocol (JDWP) and the Java Debug Interface (JDI). International Business Machines (IBM) also provides a similar functionality called "Hot Code Replace" (HCR) for its "J9" JVM platform.

Debugging tools such as Sun's debugging tool known as the "Java Debugger" ("jdb") are computer implemented and may be implemented through an IDE. An IDE is a programming environment that has been packaged as an application program, typically consisting of a code editor, a compiler or parser, a debugger and a graphical user interface (GUI) builder. The IDE may be a stand-alone application or it may be included as part of one or more existing and compatible applications. IDEs provide a user-friendly framework for writing, editing and debugging many modern object oriented programming languages.

Through debugging tools such as Sun's jdb and IBM's HCR for its J9 JVM platform, one or more classes may be redefined at run-time according to the new class definitions supplied. A program thread in the JVM may be actively executing a method that is being redefined by HCR. Such a thread need not be suspended for HCR to succeed because the JPDA specifies that in such cases threads continue to run the bytecodes of the previous version of the method. The redefined methods will be used on new invocations. HCR does not cause any initialization except that which would occur under the customary JVM semantics. In other words, redefining a class does not invoke its class initializers and no instance initializers or constructors are run. The values of pre-existing static variables will remain as they were prior to the call.

However, completely un-initialized (new) static variables will be assigned their Java Language Specification (JLS) default values.

One drawback with current HCR functionality is that a redefined class (i.e. a piece of code replaced with a new version of said code) will only be used in execution once any existing execution of the old version of the code has completed. This is marked by an unwinding of the call stack of the application thread to a point past the scope of the code which was replaced. Due to the threaded nature of JVMs, multiple different threads can be executed simultaneously and a number of such threads can unwind sufficiently to pick up newly replaced code at different points in the execution of the application program. Consequently, the application program can run with a mixture of old and new code in different threads within the same application. Thus, there is a potential for conflict in the application semantics when some threads are running old code and others are running new code.

Furthermore, new code added at application program run-time can include a different data definition such as additional or fewer variables. Thus, any offset based data access will be jeopardized at run-time when such a code change is enacted. Further, any additional variables added at run-time in new code will be un-initialized and will rely on any language specific initialization for the application which is not ideal. It is invariably the case that the application requires application specific values and does not expect new variables to have their initial values set to their JLS default values.

OBJECT OF THE INVENTION

It is an object of the invention to obviate or mitigate disadvantages associated with existing HCR functionalities.

It is another object of the invention to provide a method of identifying a JVM "safe" state at program run-time to enable code replacement to be performed at a time when there are no program threads running a version of old code that is to be replaced.

It is a further object of the invention to provide means for initializing replaced code to initialize new variables to values consistent with the application semantics.

SUMMARY OF THE INVENTION

According to a first aspect of the present invention, there is provided a method of replacing code in an object oriented application program running on a Virtual Machine (VM), the method being characterised in that it comprises the steps of: receiving at the VM a request to replace code; in response to receipt of said request, examining each thread's call stack to determine if any thread includes a method that will be made obsolete by a proposed code replacement; and, if it is determined that there are no threads that include such a method in their call stacks, performing the code replacement.

The present invention ensures that there is no mixture of old code and new (replacement) code being executed in the VM. Consequently, software developers and system administrators can be confident that a consistent set of application code is being run in the VM.

Preferably, the VM is suspended for the duration of the step of examining each thread's call stack and resumed on completion of said step.

Preferably, the step of examining each thread's call stack is conducted by the VM. Such a facility is already available in conventional debugging tools.

Alternatively, the step of examining each thread's call stack is conducted manually using a code editor function of a code debugging application.

Preferably, the step of performing a code replacement comprises redefining a class file and may comprise redefinition of a plurality of classes and/or methods.

In a preferred embodiment, the object oriented program is a Java program and the VM is a Java VM (JVM).

Preferably, for a thread whose call stack is determined not to include a method that will be made obsolete by the proposed code replacement, the method includes the step of allowing the thread to continue running.

The invention seeks to minimise suspension of threads and avoid deadlocking execution of the program. However, in the event that a thread that is allowed to continue running attempts to invoke a method that will be made obsolete by the proposed code replacement, said thread is suspended.

Preferably, for a thread whose call stack is determined to include a method that will be made obsolete by the proposed code replacement, the method includes the step of allowing the thread to continue running until the thread unwinds past that method in its call stack and then suspending said thread.

Preferably also, the method includes setting suspended threads with an attribute that indicates their suspension is associated with processing of the code replacement request. This improves traceability of program performance through use of an editor part of the debugging tool.

Preferably further, when a thread is suspended, the step of examining each thread's call stack is repeated.

The step of repeating examination of each thread's call stack may be accompanied by a suspension of the VM for the duration of said examination and a resumption of the VM on completion of said examination.

Preferably, the method includes a deadlock resolution step comprising clearing the suspended attribute from the or any suspended thread and allowing the or any suspended thread to continue running until it unwinds past the "obsolete" method in its call stack. Program deadlock may lead to a failure of the code replacement process. The deadlock resolution step seeks to mitigate this problem by finding a route around the deadlock so that code replacement can still be performed.

Alternatively the step of examining each thread's call stack will involve a two-phased suspension process. In Phase One all threads are examined prior to suspension to determine if they are likely in a safe state. Only when they are, does the step proceed to Phase Two. In Phase Two all threads are suspended and re-checked to ensure the safe state for HCR. If the check fails then Phase Two is abandoned and Phase One is repeated.

Preferably, once the code replacement step has been completed, the method includes the step of initialising new variables in the replacement code to values consistent with the application semantics.

In conventional code replacement procedures, new variables are given their respective language specification default values but this is not ideal.

Preferably, the step of initialising the new variables comprises invoking a class method to initialise new class variables and invoking an instance method to initialise new instance variables.

According to a second aspect of the present invention, there is provided a system for implementing the method in accordance with the first aspect of the invention.

According to a third aspect of the present invention, there is provided a computer for implementing the method in accordance with the first aspect of the invention.

According to a fourth aspect of the present invention, there is provided a computer readable medium containing computer code executable by a processor of a system in accordance with the second aspect of the invention for implementing the method in accordance with the first aspect of the invention.

According to a fifth aspect of the present invention, there is provided a method of identifying a safe state for code replacement in an object oriented application program running on a Virtual Machine (VM), the method being characterised in that it comprises the steps of: examining each thread's call stack to determine if any thread includes a method that will be made obsolete by a proposed code replacement; and, if it is determined that there are no threads that include such a method in their call stacks, issuing a safe state indicator for initiating commencement of code replacement.

According to a sixth aspect of the present invention, there is provided a system for implementing the method in accordance with the fifth aspect of the invention.

According to a seventh aspect of the present invention, there is provided a computer for implementing the method in accordance with the fifth aspect of the invention.

According to an eighth aspect of the present invention, there is provided a computer readable medium containing computer code executable by a processor of a system in accordance with the sixth aspect of the invention for implementing the method in accordance with the fifth aspect of the invention.

According to a ninth aspect of the present invention, there is provided method of initialising new variables in replacement code added to an object oriented application program running on a Virtual Machine (VM), the method being characterised in that it comprises the steps of: identifying the code to be replaced; uploading the replacement code to the VM; suspending threads containing the identified code; replacing the identified code with the replacement code; and, prior to resuming the threads containing the replacement code, initialising new variables in the replacement code to values consistent with the application semantics.

According to a tenth aspect of the present invention, there is provided a system for implementing the method in accordance with the ninth aspect of the invention.

According to an eleventh aspect of the present invention, there is provided a computer for implementing the method in accordance with the ninth aspect of the invention.

According to a twelfth aspect of the present invention, there is provided a computer readable medium containing computer code executable by a processor of a system in accordance with the tenth aspect of the invention for implementing the method in accordance with the ninth aspect of the invention.

Further features of the invention will be apparent from the appended claims.

BRIEF DESCRIPTION OF THE DRAWINGS

A description of the present invention will follow with reference to the accompanying drawings, of which.

DETAILED DESCRIPTION OF A PREFERRED EMBODIMENT

The foregoing and further features of the present invention will be more readily understood from a description of a preferred embodiment, by way of example thereof, with reference to the accompanying drawings.

Figure 1:
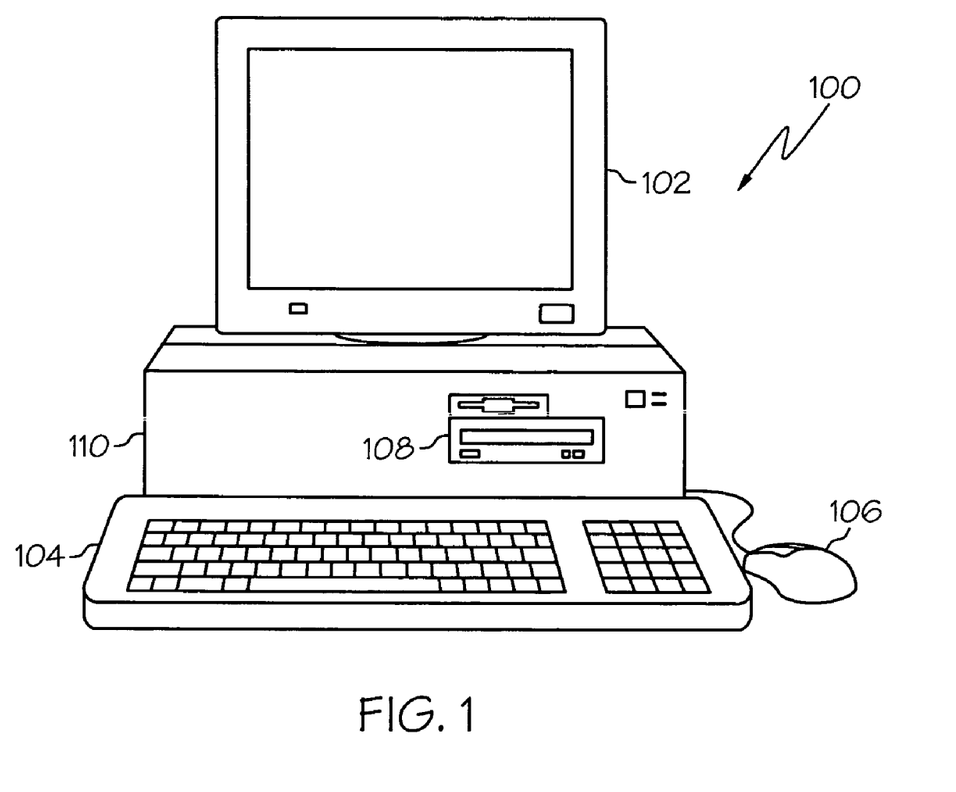
FIG. 1 is a pictorial representation depicting a data processing system in which the present invention may be implemented in accordance with a preferred embodiment of the invention.

With reference now to the figures and, in particular, with reference to FIG. 1, illustrated is a pictorial representation depicting a data processing system in which the present invention may be implemented in accordance with a preferred embodiment thereof. A personal computer (PC) 100 is depicted which includes a system unit 110, a video display terminal 102, a keyboard 104, storage devices 108, which may include floppy drives and other types of permanent and removable storage media, and mouse 106. Additional input devices may be included with PC 100. PC 100 can be implemented using any suitable computer, such as an IBM compatible PC, Apple Macintosh computer or UNIX based workstation. Although the depicted representation shows a PC, other embodiments of the present invention may be implemented in other types of data processing systems, such as network computers, Web-based television set top boxes, Internet appliances, handheld devices, etc. PC 100 also preferably includes a graphical user interface (GUI) that may be implemented by means of system software residing in computer readable media in operation within the PC 100.

Figure 2:
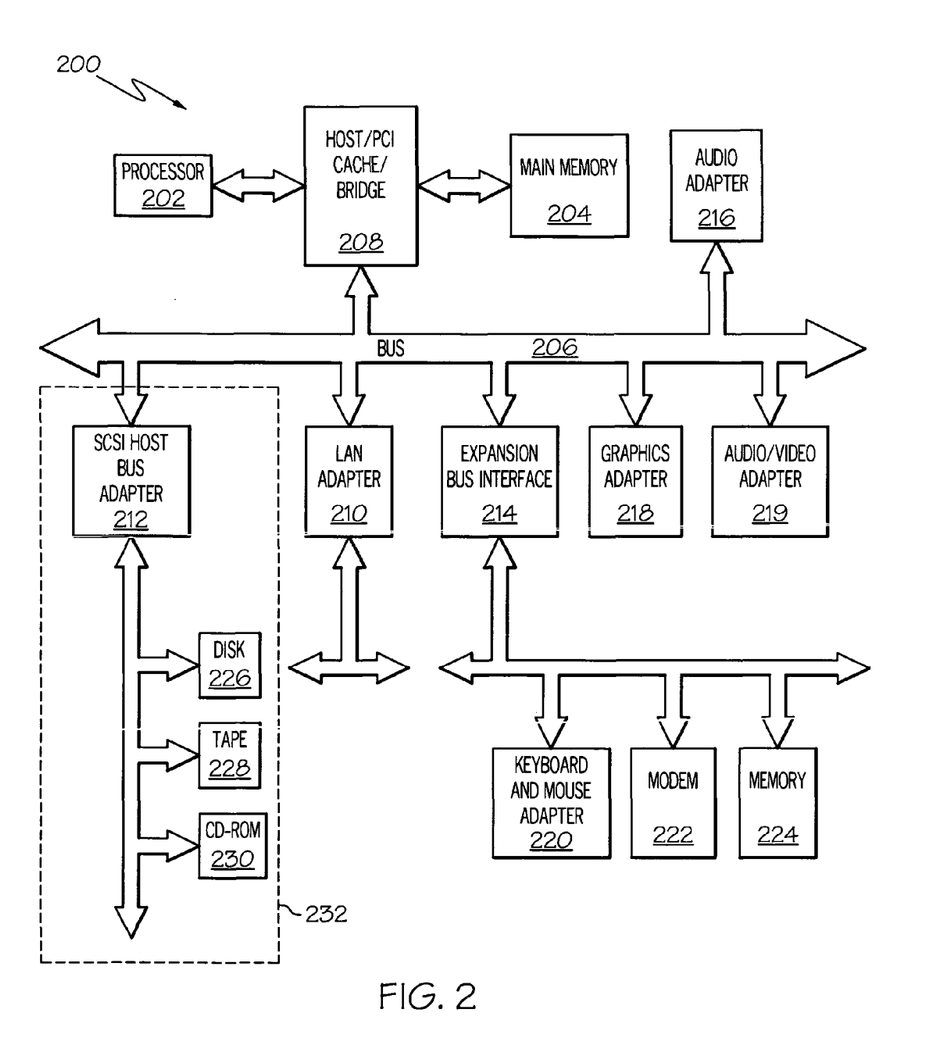
FIG. 2 is a schematic block diagram depicting a data processing system in which the present invention may be implemented in accordance with a preferred embodiment of the invention.

With reference now to FIG. 2, illustrated is a block diagram of a data processing system in which the present invention may be implemented. Data processing system 200 is an example of a computer, such as PC 100 of FIG. 1, in which an IDE and JVM implementing the processes of the present invention may be hosted. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 of FIG. 2. The operating system may be a commercially available operating system such as Microsoft Windows NT or Windows XP Operating System (OS), the IBM OS/2 operating system, the MAC OS, or UNIX operating system. An object oriented programming system such as Java may run in conjunction with the operating system and provides calls to the operating system from Java programs or applications executing on data processing system 200. An IDE may be hosted by the processing system 200 and may also run in conjunction with the operating system. The IDE is arranged to implement a Java code debugger tool such as Sun's jdb. Instructions for the operating system, the object-oriented operating system, the IDE and other applications or programs are located on storage devices, such as hard disk drive 226, and may be loaded into main memory 204 for execution by processor 202.

Those of ordinary skill in the art will appreciate that the hardware depicted in FIG. 2 may vary depending on the implementation. Other internal hardware or peripheral devices, such as flash ROM (or equivalent non-volatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations.

Figure 3:
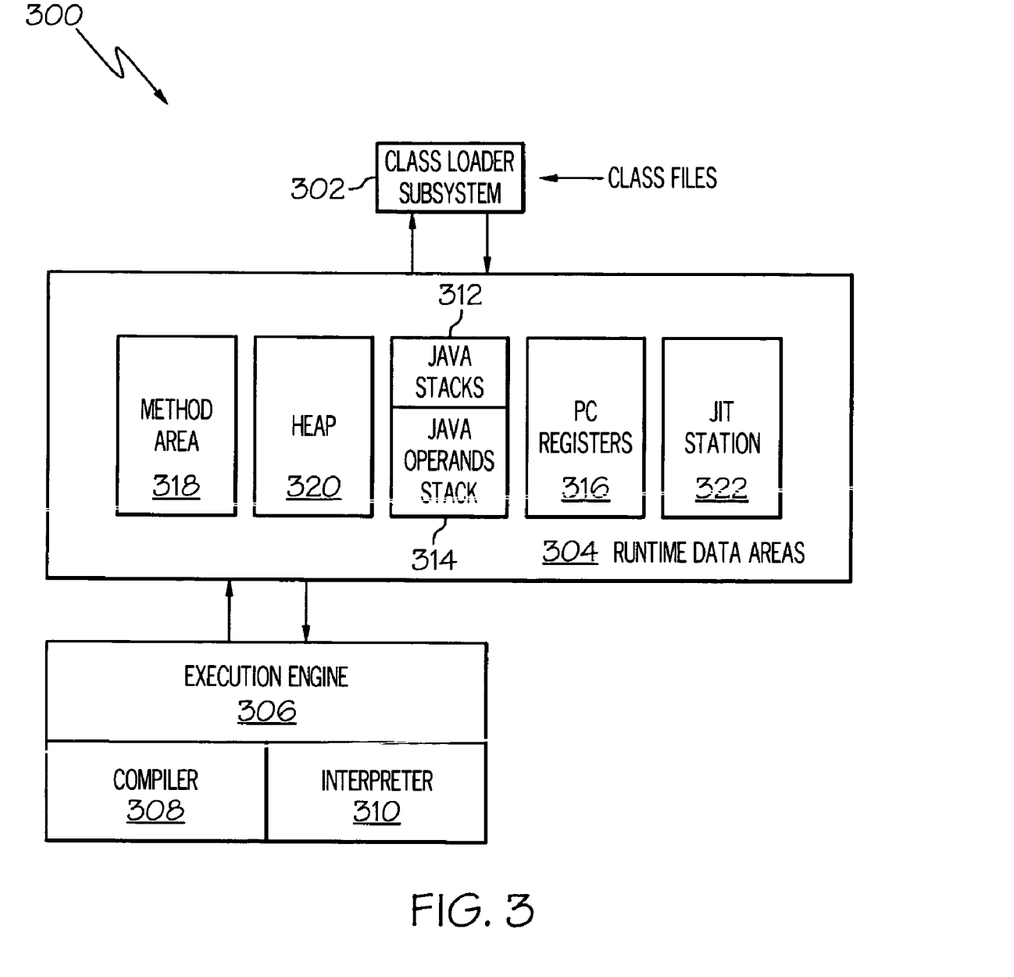
FIG. 3 is a schematic block diagram of a Java Virtual Machine (JVM) in which the present invention may be implemented in accordance with a preferred embodiment of the invention.

With reference now to FIG. 3, illustrated is a block diagram of a JVM in accordance with a preferred embodiment of the present invention. The JVM 300 includes a class loader subsystem 302, which is a mechanism for loading types, such as classes and interfaces, given fully qualified names. JVM 300 also includes run-time data areas 304 and execution engine 306.

Execution engine 306 is a mechanism for executing instructions contained in any method of the classes loaded by class loader subsystem 302. In the depicted example, execution engine 306 includes a Just In Time compiler 308 and interpreter 310, but it will be understood that the execution engine 306 may comprise only one of the compiler 308 and interpreter 310. Bytecodes make up a method and are a sequence of instructions for JVM 300. Each instruction consists of an opcode followed by zero or more fixed operands. The opcode indicates the operation to be performed. Variable operands and data appear on the Java operand stack 314, which appears within the Java stack 312. Interpreter 310 will cause the execution of the necessary code or instructions in response to this bytecode.

Compiler 308 may be a Just In Time compiler in which the bytecodes of a method are normally compiled to native machine code the first time the method is invoked after it has been selected as a candidate for compilation. Selection may be based on a method's former CPU consumption, number of invokes, or some other criteria. It is also possible that all methods may be selected for compilation without regard to criteria.

Run-time data areas 304 includes the Java stacks 312, PC registers 316, method area 318, heap 320, and JIT station 322. These different data areas represent the organization of memory needed by JVM 300 to execute a program. Java stacks 312 is used to store the state of Java method invocations while PC registers 316 is used to indicate the next instruction to be executed. The Java stacks 312 are divided into frames to store information used during execution of Java methods. Method area 318 contains class data while heap 320 contains all instantiated objects. JIT station 322 is used to store all information needed for compilation of the method such as flow control information, register assignments, and virtual operand stack content. The JIT station 322 may be located as a single contiguous area of memory or may be multiple non-contiguous areas of memory and may be dynamically allocated or reusable.

Figure 4:
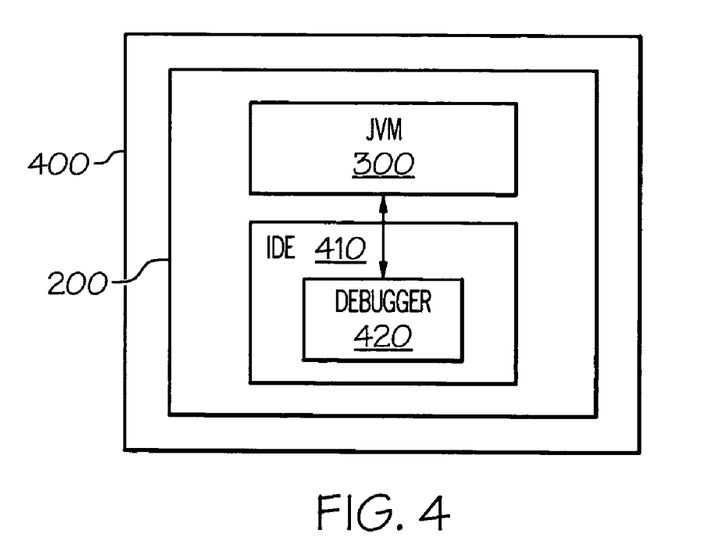
FIG. 4 is a schematic block diagram of a data processing system in accordance with the preferred embodiment of the invention.

The preferred embodiment of the invention depicted by FIG. 4 comprises a computer system 400 comprising a processing system such as the processing system 200 of FIG. 2 which hosts a JVM such as JVM 300 of FIG. 3 and an IDE 410 which in turn hosts a Java debugging tool 420. In the following description, it will be assumed that the debugging tool 420 comprises Sun's jdb command-line debugging tool, but it will be appreciated that any suitable Java debugging tool could be implemented by the IDE 410.

Whilst the following description of a preferred embodiment refers to the debugging tool being implemented through an IDE, it will be appreciated that an IDE is not essential to implement a debugging tool nor is a debugging tool essential for safe state HCR in accordance with the invention. For example, replacement code could be provided to a running program using other transport mechanisms such as a utility program written specifically for the task of updating the running program, or it might comprise an extension to the JVM such that it periodically checks a directory on a host computer hard disk for updates to the program it is executing. Also, the replacement code could be uploaded by any suitable agent of the JVM and thus this feature of the invention is not limited to a debugging system or a program development system for loading replacement code. The present invention is directed to determining a safe state for performing HCR and initialising the affected variables and, as such, nothing in the following description, which is offered by way of example only, should limit the scope of the present invention.

Figure 5:
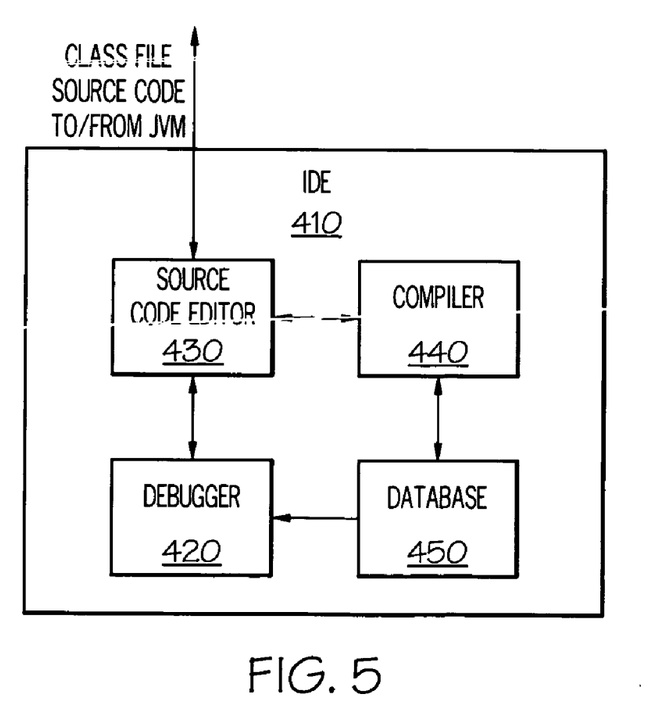
FIG. 5 is a schematic block diagram of an Integrated Development Environment (IDE) comprising a part of the data processing system in accordance with the preferred embodiment of the invention.

As depicted in FIG. 5, the IDE 410 hosts the JPDA code debugging tool 420 and includes a source code editor 430 and a compiler 440 that can parse replacement source code for source code files loaded and running on the JVM 300 whilst being edited/written by a software developer using the editor 430. The editor 430 can invoke the debugging tool 420 to perform code debugging in a known manner. The IDE 410 may include a database 450 for storing data pertaining to code debugging processes. The IDE 410, the compiler 440, the editor 430 and the debugging tool 420 are software based modules that are computer implemented. Software code for implementing these modules may be stored on a memory of the processing system 200.

Figure 6:
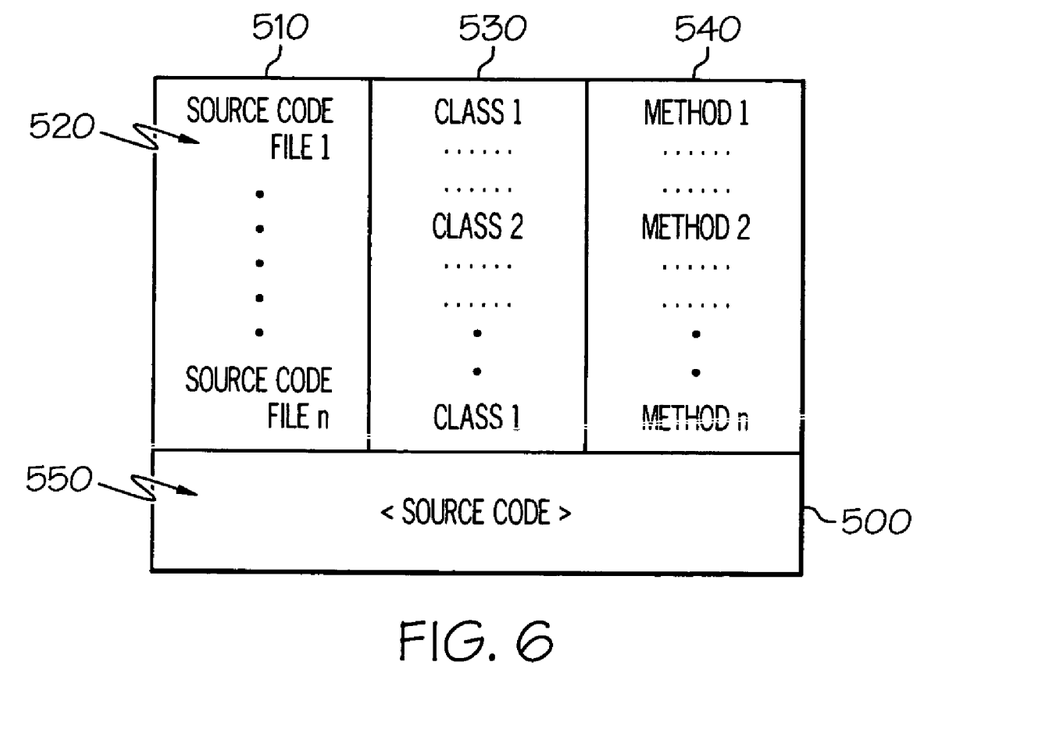
FIG. 6 illustrates a main window of a source code editor of a code debugger tool displayed by software implementing the preferred embodiment of the invention.

FIG. 6 illustrates an editor display window displayed by software implementing the invention in accordance with the preferred embodiment. Main window 500, which is visible to the software developer who is using the major functions of the system 400, includes a file pane 510 that displays a list of source code files 520 in a tree view or the like as will be familiar to those skilled in the art. Each file 520 represents a file that is loaded into the JVM 300. The tree in tree pane 510 can be expanded or contracted in a known fashion to represent one or more files 520. For example, a Java source code file 520 can be expanded to represent all classes and interfaces comprising said file 520.

A relationship pane 530 displays the inheritance relationships between the file 520 selected in file pane 510 and other files with which is associated by inheritance. For example, if a file is selected in file pane 510, all the interfaces within the file 520 and their inheritance relationships will be displayed in relationship pane 530.

A method pane 540 displays a list of methods of a class that is selected in relationship pane 530.

In an edit pane 550, an editor window is displayed that allows the developer to redefine the method implementation of a method that is selected in method pane 540. The code for the method implementation is displayed in edit pane 550.

The editor window 500 may comprise other scrollable panes (not shown) that allow the developer to examine thread call stacks, method frames or the like.

In contrast with the conventional case where a Java redefineClasses method call from the IDE editor 430 to the JVM 300 results in the JVM 300 uploading the replacement code and immediately using it to replace some source code in identified class definitions with the danger that different application threads may run old and new code simultaneously, the present invention provides an enhanced JVM 300 that performs code replacement only when all threads in the system have been identified as no longer running old code, i.e. when a safe state for code replacement is identified. Once such a safe state is reached, the JVM 300 uses the uploaded replacement code to redefine the identified class definitions. In addition, once the replacement code process has been completed, the enhanced JVM 300 performs an application specific method run for each class and instance redefined. A class method initializes static variables and an instance method initializes instance variables to values consistent with the application semantics, i.e. to meaningful application specific values. The present invention therefore adds an artificial constraint to the JVM implementation that is compatible with the JPDA specification.

The enhanced JVM is put into effect through the following steps.

1. Uploading Code to be Replaced

The software developer uses the IDE editor 430 to identify source code (class files) running on the JVM 300 that is to be modified (replaced). This might, by way of example, comprise using the editor 430 to edit the definition of say class file my.class.Bar to:
add a static variable
 public static Object FOO;
change a variable declaration
 public long myVariable;
and change a method implementation to remove references to the static variable.

In a conventional code replacement process on an application running on a JVM running the old code, the JVM would attempt to reference the outgoing static variable resulting in method failure or, more likely, fail the code replacement request altogether.

In the present invention, the IDE 410 enables the developer to define the specific class and instance initialisation code that will be required by the JVM 300 to perform the class and instance initializations once the safe state code replacement process has been completed. This code is also uploaded to the JVM 300 from the editor 430 in readiness for initialization following a safe state code replacement process. This is Java code that the IDE compiler 440 compiles to synthetic methods in the replacement class file that is uploaded to the JVM 300. A synthetic method is a Java method (i.e. bytecodes) contained in the class file but for which there is no corresponding source code in the .java file. In this example, the developer uses the IDE 410 to add HCR specific variable initialization methods that have no corresponding Java source code. These extra methods are specifically named so that the JVM 300 can find them to properly initialize the variables. In practise, the developer is given an opportunity to enter some initialization code in a part of the IDE 410. The IDE 410 combines the regular class file (compiled from the java source code) and the HCR-specific initialization code (compiled from the IDE variable initialization entry field) into a single class file. It this combined class file that is sent to the JVM 300 as part of the redefineClasses function. Since the regular java source and binary code is not burdened with the HCR specific initialization code, subsequent use of the code has no knowledge of the initialization-specific code that was required for HCR.

In an alternative not shown arrangement, the updated class files are loaded into the JVM in production by a suitable program that connects to the JVM and transmits the replacement code without any further human intervention.

In the foregoing example, the initialization class file carries the (synthetic) initialization methods as:
 static my/class/Bar/<hcrclinit>( )V and
 static my/class/Bar/<hcrinit>(Lmy/class/Bar;)V These names are chosen to look like the synthetic class initialization method <clinit> normally found in a class file. The JVM already knows to run, for example, the <clinit> method when a class is being initialized. Therefore, in the present invention the JVM 300 is extended to know that it must run the <hcrclinit> method if the class was HCR replaced, and <hcrinit> on each instance of the class.

In this case, method <hcrclinit> initializes the static variable FOO, i.e.

---

```
<hcrclinit> {
    Foo = new Foo ( ) ;
}
    and the method <hcrinit> initializes each instance's
usage of the variable myVariable, i.e.
<hcrinit> {
    myVariable = System.identityHashCode (arg1);
}
```

---

The IDE 410 uploads the replacement code to the JVM 300 using the existing JPDA function to redefineClasses and blocks awaiting a response from the JVM 300.

2. Determining a Safe State for Code Replacement

On receiving the redefineClasses invocation, the JVM 300 accepts the uploaded class file containing replacement code and identifies the affected methods. This is a known functionality of existing code replacement mechanisms known as "stack-walking" that will be familiar to the skilled artisan and so need not be described further here. In conventional code replacement processing, a stack frame for a replaced method is required to return a special identifier such as OBSOLETE_METHOD_ID as its method identifier. Typically development systems such as IDEs 410 recognise this special identifier and display a message in a pane of the editor window 500 indicating to the developer that the method so identified is out of sync with the code in the development environment. A safe state for a code replacement process in a running JVM 300 can be considered as being that state where no application thread call stack contains the potential for returning an obsolete method identifier should a proposed code replacement proceed.

Upon receiving the request for code replacement, i.e. receiving the redefineClasses invocation, the JVM 300 walks each thread call stack to determine if it contains any of the affected methods, i.e. methods that are intended to be redefined using the replacement code uploaded to the JVM 300 and which would therefore become obsolete (have the potential to return an obsolete identifier) if the code replacement proceeded. If a thread has no such methods in its current call stack that will be obsoleted by the proposed code replacement then that thread call stack is already "safe" from a code replacement perspective. If it is determined that all current threads are safe then the code replacement procedure can proceed as described hereinafter. The JVM 300 may be arranged to issue a safe state indicator for display on a pane of the editor window when all threads are determined to have reached a safe state. An existing interface into the JVM 300 allows the IDE 410 to determine the state of each thread. In this embodiment, the IDE 410 would query the thread to determine if it was running (trying to achieve a safe state), suspended by the HCR process (identified by the deadlock prevention attribute) or suspended by the application (identified by the lack of such attribute). The display of the state of the threads to the developer could be through highlighting the thread by color, emboldening etc in an editor display or through icons, labels or the like. The state of a thread can be determined through a JVMPI interface to the JVM 300. For the duration of the "safety check" of examining each thread's call stack, the JVM 300 is preferably suspended from running a current application. Alternatively the step of examining each thread's call stack will involve a two-phased suspension process. In Phase One all threads are examined prior to suspension to determine if they are likely in a safe state. Only when they are, does the step proceed to Phase Two. In Phase Two all threads are suspended and re-checked to ensure the safe state for HCR. If the check fails then Phase Two is abandoned and Phase One is repeated. The JVM 300 is resumed once the safety check is completed.

In an alternative arrangement, the examination of the threads, call stacks can be conducted manually using the IDE editor 430 to display the thread call stacks on a pane of the editor window 500. The developer manually examines each threads call stack and highlights using a mouse controlled cursor or the like those threads that contain affected methods as a means of identifying the affected threads to the JVM 300.

For a thread that is determined to be "safe", the JVM 300 allows such thread to continue running but will suspend said thread in the event that it attempts to invoke an affected method.

If one or more of the threads, call stacks are determined to include an affected method then these threads are permitted by the JVM 300 to continue running until their call stacks have unwound past the affected methods. The JVM 300 begins to monitor method exits for each of these threads. This is also a known functionality of existing code replacement mechanisms that will be familiar to the skilled artisan and so need not be described further here. In most implementations, this will comprise the same mechanisms as used to generate JVMPI_EVENT_METHOD_EXIT events for the JVM Profiler Interface (JVMPI).

When an affected thread exits an affected method, the thread is suspended by the JVM 300 and is set with an attribute that indicates that it is suspended for code replacement purposes. Within the JVM, threads have a data structure called a Thread Block that contains information about the thread for various purposes.

The thread block is extended to include attribute information pertaining to HCR safe state. This is an internal data structure that is not visible to the developer other than via proprietary APIs to query the attribute of a thread. The display of the attribute can be made through highlighting through color or emboldening etc or by attachment of an icon, label or the like.

The IDE 410 would learn of the safe state via a custom JVMPI event (a known mechanism for IDEs to learn about the state changes within a running JVM).

In response to the suspension of a thread, another safety check is performed including suspending the JVM 300 for the duration of the check. This is to avoid the possibility of running further affected code on any still current thread not yet suspended or completed.

Given that threads are being suspended by the JVM 300 during processing of a code replacement request, there is a potential for deadlocking the application program being executed by the JVM 300. In order to reduce this possibility before a safe state for code replacement is reached, the JVM 300 simply clears the code replacement attributes from suspended threads and allows the threads to resume running old code in anticipation that the call stacks of said threads will subsequently reach a global safe state. The JVM 300 may be arranged to enable the deadlock resolution step to be invoked on a limited number of occasions before it is determined by the JVM 300 that the code replacement request is considered as having failed. In an alternative arrangement, the JVM 300 determines failure of a code replacement request through a time-out mechanism whereby, if after a predetermined period a safe state of all threads condition has not been realized, the JVM 300 indicates that the code replacement request has failed. This comprises the JVM 300 returning an error code from the redefineClasses function that initiated the replacement. The IDE 410 can respond to the failed request to redefineClasses by a failure indicator to be displayed on a pane of the editor window 500.

In the event that the JVM 300 determines that a code replacement request has failed it resumes the application threads to run "old" code.

3. JVM Performs Safe Code Replacement and Initialization

Once a safe state for all threads is reached, the code replacement procedure occurs to install new class and method definitions in a conventional manner that will be familiar to the skilled artisan. However, on completion of the code replacement procedure and before all the threads are resumed, the JVM 300 invokes the <hcrclinit> initialization method for each class redefined and the <hcrinit> initializer method for each instance of that class. Once all redefined classes and methods have been initialized, the threads are resumed. The redefineClasses function then returns with a success code or indicator for display on a pane of the editor window 500 to confirm that safe code replacement has been completed. The developer can then be assured that all threads in the application are running the new code exclusively and that each redefined class and instance is properly initialized with values that are compatible with the application semantics.

In summary, the invention is directed to a method of replacing code in an object oriented application program running on a Virtual Machine (VM). The method comprises the steps of receiving at the VM a request to replace code; in response to receipt of said request, examining each thread's call stack to determine if any thread includes a method that will be made obsolete by a proposed code replacement; and, if it is determined that there are no threads that include such a method in their call stacks, performing the code replacement. However, for a thread whose call stack is determined to include a method that will be made obsolete by the proposed code replacement, the method includes the step of allowing the thread to continue running until the thread unwinds past that method in its call stack and then suspending said thread. This comprises a part of a process of determining a safe state for code replacement. The invention is also directed to a method of initializing new variables in such replacement code. The variable initialization method comprises the steps of identifying the replaced code and prior to resuming threads containing the replacement code, initializing new variables in the replacement code to values consistent with the application semantics.

The invention claimed is:

1. A method of replacing code in an object oriented application program running on a virtual machine, the method comprising the steps of:
   receiving at the virtual machine a request to replace code;
   in response to receipt of said request, a processor examining each thread's call stack to determine if any thread includes a method that will be made obsolete by a proposed code replacement; and,
   if it is determined that there are no threads that include such a method in their call stacks, performing the code replacement.

2. The method of claim 1, wherein the virtual machine is suspended for the duration of said examining each thread's call stack and resumed on completion of said step.

3. The method of claim 1, wherein examining each thread's call stack is conducted by the virtual machine.

4. The method of claim 1, wherein examining, each thread's call stack is conducted manually using a code editor function of a code debugging application.

5. The method of claim 1, wherein performing a code replacement comprises redefining a class file.

6. The method of claim 1, wherein the code replacement request comprises a proposal to redefine a plurality of classes and/or methods.

7. The method of claim 1, wherein the code replacement request is issued from a code debugging system.

8. The method of claim 7, wherein the virtual machine is remote from said code debugging system.

9. The method of claim 1, wherein the object oriented program is a Java program and the virtual machine is a Java virtual machine.

10. The method of claim 1, wherein for a thread whose call stack is determined not to include a method that will be made obsolete by the proposed code replacement, allowing the thread to continue running.

11. The method of claim 10, further comprising suspending the thread in the event that the thread allowed to continue running attempts to invoke a method that will be made obsolete by the proposed code replacement.

12. The method of claim 1, wherein for a thread whose call stack is determined to include a method that will be made obsolete by the proposed code replacement, allowing the thread to continue running until the thread unwinds past that method in its call stack and then suspending said thread.

13. The method of claim 11, further comprising setting suspended threads with an attribute that indicates their suspension is associated with processing of the code replacement request.

14. The method of claim 11, wherein when a thread is suspended, said examining each thread's call stack is repeated.

15. The method of claim 14, wherein said repeating examination of each thread's call stack is accompanied by a suspension of the virtual machine for the duration of said repeating examination and a resumption of the virtual machine on completion of said examination.

16. The method of claim 13, further comprising clearing the suspended attribute from the suspended thread and allowing the suspended thread to continue running until it unwinds past an obsolete method in its call stack.

17. The method of claim 16, wherein the virtual machine will return a code replacement failed result if said clearing the suspended attribute is performed more than a predetermined number of times for any code replacement request or a time out period expires for any such request.

18. The method of claim 17, wherein, in response to the virtual machine returning a code replacement failure result, the virtual machine continues to run old code.

19. The method of claim 1, further comprising, in response to the code replacement being completed, initializing new variables in the replacement code to values consistent with the application semantics.

20. The method of claim 19, wherein said initializing the new variables comprises invoking a class method to initialize new class variables and invoking an instance method to initialize new instance variables.

21. The method of claim 20, wherein the class method and instance method each comprise synthetic methods.

22. A system for replacing code in an object oriented application program running on a virtual machine, the system comprising:
   a central processing unit (CPU), a computer readable memory, and a computer readable storage media;
   first program instructions for creating a code debugging tool for issuing a request to replace code to the virtual machine; and
   second program instructions that create means, responsive to said code replacement request to examine each thread's call stack, to determine if any thread includes a method that will be made obsolete by a proposed code replacement and, where said means determines that there are no threads that include such a method in their call stacks, said means enables the virtual machine to perform the code replacement, and wherein
   said first and second program instructions are stored on said computer readable storage media for execution by said CPU via said computer readable memory.

23. The system of claim 22, wherein the means responsive to said code replacement request comprises the virtual machine.

24. The system of claim 22, wherein the means responsive to said code replacement request comprises a code editor part of the code debugging tool.

25. The system of claim 22, wherein virtual machine is arranged to redefine a class file when performing the code replacement.

26. The system of claim 22, wherein the virtual machine is arranged to redefine a plurality of classes when performing the cock replacement.

27. The system of claim 22, wherein the virtual machine is remote from said code debugging system.

28. The system of claim 22, wherein the object oriented program is a Java program and the virtual machine is a Java virtual machine.

29. The system of claim 22, wherein the virtual machine is arranged to allow a thread to continue running in response to said thread's call stack being determined not to include a method that will be made obsolete by the proposed code replacement.

30. The system of claim 29, wherein the virtual machine is arranged to suspend a thread in the event that the thread allowed to continue running attempts to invoke a method that will be made obsolete by the proposed code replacement.

31. The system of claim 22, wherein, for a thread whose call stack is determined to include a method that will be made obsolete by the proposed code replacement, the virtual machine is arranged to allow the thread to continue running until the thread unwinds past that method in its call stack and to then suspend said thread.

32. The system of claim 30, wherein the virtual machine is arranged to set suspended threads with an attribute that indicates their suspension is associated with processing of the code replacement request.

33. The system of claim 30, wherein the system is further arranged to repeat examining each thread's call stack when a thread is suspended.

34. The system of claim 33, wherein the system is further arranged to suspend the virtual machine for the duration of the repeat examination of the threads' call stacks and to resume the virtual machine on completion of said repeat examination.

35. The system of claim 32, wherein the virtual machine is further arranged to effect a deadlock resolution by:
   clearing the suspended attribute from the suspended thread to create a cleared thread; and
   allowing the cleared thread to continue running until the cleared thread unwinds past the obsolete method in the call stack of the cleared thread.

36. The system of claim 35, wherein the virtual machine is arranged to return a code replacement failed result if the deadlock resolution is performed after a time out period expires.

37. The system of claim 36, wherein the system is further configured for, in response to the virtual machine returning a code replacement failure result, continuing to run old code.

38. The system of claim 22, wherein the virtual machine is arranged to initialize new variables in the replacement code to values consistent with the application semantics once code replacement has been completed.

39. The system of claim 38, wherein the virtual machine invokes a class method to initialize new class variables and invokes an instance method to initialize new instance variables.

40. A computer comprising a memory storing program code executable by a processor for:
   receiving at a virtual machine a request to replace code;
   in response to receipt of said request, examining each thread's call stack to determine if any thread includes a method that will be made obsolete by a proposed code replacement; and,
   if it is determined that there are no threads that include such a method in their call stacks, performing the code replacement.

41. A computer readable storage medium comprising computer code executable by a processor for:
   receiving at a virtual machine a request to replace code;
   in response to receipt of said request, examining each thread's call stack to determine if any thread includes a method that will be made obsolete by a proposed code replacement; and,
   if it is determined that there are no threads that include such a method in their call stacks, performing the code replacement.

42. A method of identifying a safe state for code replacement in an object oriented application program running on a virtual machine, the method comprising the steps of:
   examining, by a specifically-programmed processor, each thread's call stack to determine if any thread includes a method that will be made obsolete by a proposed code replacement; and,
   in response to determining that there are no threads that include such a method in their call stacks, issuing a safe state indicator for initiating commencement of code replacement, wherein a safe state is defined as a state in which no call stack is capable of returning an obsolete method if the proposed code replacement proceeds.

43. The method of claim 42, wherein the virtual machine is suspended for the duration of said examining each thread's call stack and resumed on completion of said examining.

44. The method of claim 42, wherein said examining each thread's call stack is conducted by the virtual machine.

45. The method of claim 42, Wherein said examining each thread's call stack is conducted manually using a code editor function of a code debugging application.

46. The method of claim 42, wherein the object oriented program is a Java program and the virtual machine is a Java virtual machine.

47. The method of claim 42, wherein for a thread whose call stack is determined not to include a method that will be made obsolete by the proposed code replacement, allowing the thread to continue running.

48. The method of claim 47, further comprising suspending the thread in the event that the thread allowed to continue running attempts to invoke a method that will be made obsolete by the proposed code replacement.

49. The method of claim 42, wherein for a thread whose call stack is determined to include a method that will be made obsolete by the proposed code replacement, allowing the thread to continue running until the thread unwinds past that method in its call stack and then suspending said thread.

50. The method of claim 48, further comprising setting suspended threads with an attribute that indicates their suspension is associated with processing of the code replacement request.

51. The method of claim 48, wherein, in response to a thread being suspended, repeating said examining each thread's call stack.

52. The method of claim 51, wherein said repeating examination of each thread's call stack is accompanied by a suspension of the virtual machine for the duration of said examination and a resumption of the virtual machine on completion of said examination.

53. The method of claim 50, further comprising a deadlock resolution, wherein the deadlock resolution comprises clearing the suspended attribute from the suspended thread and allowing the suspended thread to continue running until it unwinds past the obsolete method in its call stack.

54. The method of claim 53, wherein the virtual machine returns an unsafe state indicator for code replacement if the deadlock resolution is performed more than a predetermined number of times.

55. The method of claim 54, wherein, where the virtual machine returns an unsafe state indicator for code replacement, the virtual machine continues to run old code.

56. A system for identifying a safe state for code replacement in an object oriented application program running on a virtual machine, the system comprising:
   a central processing unit (CPU), a computer readable memory, and a computer readable storage media;
   first program instructions for examining each thread's call stack to determine if any thread includes a method that will be made obsolete by a proposed code replacement; and
   second program instructions for, if said means determines that there are no threads that include such a method in their call stacks, issuing a safe state indicator for initiating commencement of code replacement; and wherein said first and second program instructions are stored on said computer readable storage media for execution by said CPU via said computer readable memory.

57. The system of claim 56, wherein the object oriented program is a Java program and the virtual machine is a Java virtual machine.

58. The system of claim 56, wherein the virtual machine is further arranged to allow a thread to continue running where said thread's call stack is determined not to include a method that will be made obsolete by the proposed code replacement.

59. The system of claim 58, wherein the virtual machine is further arranged to suspend a thread in the event that the thread allowed to continue running attempts to invoke a method that will be made obsolete by the proposed code replacement.

60. The system of claim 56, wherein, for a thread whose call stack is determined to include a method that will be made obsolete by the proposed code replacement, the virtual machine is further arranged to allow the thread to continue running until the thread unwinds past that method in its call stack and to then suspend said thread.

61. The system of claim 59, wherein the virtual machine is further arranged to set suspended threads with an attribute that indicates their suspension is associated with processing of the code replacement request.

62. The system of claim 59, wherein the system is further arranged to repeat examining each thread's call stack when a thread is suspended.

63. The system of claim 62, wherein the system is further arranged to suspend the virtual machine for the duration of repeat examination of the threads' call stacks and to resume the virtual machine on completion of said repeat examination.

64. The system of claim 61, wherein the virtual machine is further arranged to effect a deadlock resolution, wherein the deadlock resolution comprises;
   clearing the suspended attribute from the suspended thread, and
   allowing the suspended thread to continue running until it unwinds past the obsolete method in its call stack.

65. The system of claim 64, wherein the virtual machine is further arranged to return an unsafe state for a code replacement indicator result if the deadlock resolution is performed more than a predetermined number of times.

66. The system of claim 65, wherein, the system is further configured to, in response to the virtual machine returning a safe state for code replacement indicator, continue running old code.

67. A computer comprising a memory storing program code executable by a processor for:
   examining each thread's call stack to determine if any thread includes a method that will be made obsolete by a proposed code replacement; and,
   if it is determined that there are no threads that include such a method in their call stacks, issuing a safe state indicator for initiating commencement of code replacement.

68. A computer readable medium containing computer code executable by a processor for:
   examining each thread's call stack to determine if any thread includes a method that will be made obsolete by a proposed code replacement; and,
   if it is determined that there are no threads that include such a method in their call stacks, issuing a safe state indicator for initiating commencement of code replacement.

69. A method of initializing new variables in replacement code added to an object oriented application program running on a virtual machine, the method comprising:
   identifying code to be replaced;
   uploading the replacement code to the virtual machine;
   suspending threads containing the identified code;
   replacing the identified code with the replacement code; and,
   prior to resuming the threads containing the replacement code, initializing new variables in the replacement code to values consistent with application semantics for an application of which the threads are components.

70. The method of claim 69, wherein initializing the new variables comprises invoking a class method to initialize new class variables and invoking an instance method to initialize new instance variables.

71. The method of claim 70, wherein the class method and instance method each comprise synthetic methods.

72. The method of claim 69, further comprising suspending all application threads prior to replacing the identified code with the replacement code.

73. A system for initializing new variables in replacement code added to an object oriented application program running on a virtual machine, the system comprising:
   a central processing unit (CPU), a computer readable memory, and a computer readable storage media;
   first program instructions for identifying code to be replaced; and
   second program instructions for uploading replacement code to the virtual machine, wherein the virtual machine is arranged to:
   suspend threads containing the identified code;
   replace the identified code with the replacement code; and,
   prior to resuming the threads containing the replacement code,
   initialize new variables in the replacement code to values consistent with the application semantics; and wherein said first and second program instructions are stored on said computer readable storage media for execution by said CPU via said computer readable memory.

74. The system of claim 73, wherein the virtual machine is arranged to initialize the new variables by invoking a class method to initialize new class variables and invoking an instance method to initialize new instance variables.

75. The system of claim 74, wherein the class method and instance method each comprise synthetic methods.

76. The system of claim 75, wherein the virtual machine is further arranged to suspend all application threads prior to replacing the identified code with the replacement code.

77. A computer comprising a memory storing program code executable by a processor for:
- identifying code to be replaced;
- uploading replacement code to a virtual machine;
- suspending threads containing the identified code;
- replacing the identified code with the replacement code; and,
- prior to resuming the threads containing the replacement code, initializing new variables in the replacement code to values consistent with the application semantics.

78. A computer readable medium containing computer code executable by a processor for:
- identifying code to be replaced;
- uploading replacement code to a virtual machine;
- suspending threads containing the identified code;
- replacing the identified code with the replacement code; and,
- prior to resuming the threads containing the replacement code, initializing new variables in the replacement code to values consistent with the application semantics.

* * * * *